(12) United States Patent
Lapierre et al.

(10) Patent No.: US 9,858,137 B2
(45) Date of Patent: Jan. 2, 2018

(54) NETWORK TEST SYSTEM

(71) Applicant: EXFO INC., Quebec (CA)

(72) Inventors: Dominic Lapierre, Rigaud (CA);
Bruno Giguere, Pierrefonds (CA);
Sylvain Nadeau, Vaudreuil-Dorion
(CA); Gilles Buteau, Laval (CA)

(73) Assignee: EXFO Inc., Québec, QC (CA)

( * ) Notice: Subject to any disclaimer, the term of this patent is extended or adjusted under 35 U.S.C. 154(b) by 84 days.

(21) Appl. No.: 14/558,773

(22) Filed: Dec. 3, 2014

(65) Prior Publication Data

US 2015/0242294 A1  Aug. 27, 2015

Related U.S. Application Data

(60) Provisional application No. 61/911,495, filed on Dec. 4, 2013.

(51) Int. Cl.
*G06F 11/00* (2006.01)
*G06F 11/07* (2006.01)
*G06F 11/22* (2006.01)

(52) U.S. Cl.
CPC ........ *G06F 11/079* (2013.01); *G06F 11/2294* (2013.01)

(58) Field of Classification Search
CPC ............... G06F 11/2294; G06F 11/079; H04L 12/2697; H04L 12/26; H04B 10/07–10/0799
See application file for complete search history.

(56) References Cited

U.S. PATENT DOCUMENTS

| 4,545,011 A | 10/1985 | Lyon et al. |
| 4,545,013 A | 10/1985 | Lyon et al. |

(Continued)

FOREIGN PATENT DOCUMENTS

| EP | 2398188 | 12/2011 |
| WO | WO 02103543 | 12/2002 |

(Continued)

OTHER PUBLICATIONS

Extended European Search Report for EP 14195807.4-1862, dated Apr. 16, 2015.

(Continued)

*Primary Examiner* — Michael Maskulinski
(74) *Attorney, Agent, or Firm* — Gowling WLG (Canada); Benoit Yelle

(57) ABSTRACT

A test system and a related method, the system comprising a test processing agent and local test device(s). The test processing agent processes test measurements related to a network-under-test into test results. The test processing agent is decoupled from the network-under-test, e.g., by being reachable through a network communication link distinct from the network-under-test. The local test device comprises a firmware module and a network interface (NI) module. The firmware module depends on external instructions for initiating a test sequence on the network-under-test. The NI module comprises at least one physical port connectable to the network-under-test. The physical port is used for initiating the test sequence. The test processing agent receives the test measurements following the initiation of the test sequence by the local test device and allows access to the test results.

22 Claims, 3 Drawing Sheets

(56) References Cited

U.S. PATENT DOCUMENTS

| | | | |
|---|---|---|---|
| 7,281,167 B2 | 10/2007 | Dubé | |
| 7,386,778 B2 | 6/2008 | Udell et al. | |
| 7,389,453 B2 | 6/2008 | Udell | |
| 8,315,655 B1 | 11/2012 | Cole | |
| 8,654,790 B2* | 2/2014 | Haver | H04L 12/2697 370/394 |
| 2005/0240372 A1 | 10/2005 | Monk | |
| 2008/0021951 A1 | 1/2008 | Lurie et al. | |
| 2008/0095068 A1* | 4/2008 | Uysal | H04L 43/08 370/252 |
| 2010/0064763 A1 | 3/2010 | Gaikwad et al. | |
| 2010/0218044 A1* | 8/2010 | Roblett | H04L 43/50 714/32 |
| 2011/0055632 A1 | 3/2011 | Zimmerman | |
| 2011/0167425 A1 | 7/2011 | Lurie et al. | |
| 2012/0155496 A1* | 6/2012 | Yasuie | H04L 43/50 370/503 |
| 2012/0238260 A1 | 9/2012 | Zellner et al. | |
| 2012/0307666 A1 | 12/2012 | Giguere et al. | |
| 2013/0017807 A1 | 1/2013 | Rooyen et al. | |
| 2013/0132774 A1* | 5/2013 | Somendra | G06F 11/3688 714/32 |
| 2013/0297802 A1* | 11/2013 | Laribi | H04L 47/80 709/226 |
| 2015/0195182 A1* | 7/2015 | Mathur | H04L 43/50 714/27 |
| 2015/0261635 A1* | 9/2015 | Hayes | G06F 11/221 714/41 |

FOREIGN PATENT DOCUMENTS

| | | |
|---|---|---|
| WO | WO2008149153 | 12/2008 |
| WO | WO 2013020045 | 2/2013 |
| WO | WO 2013020110 | 2/2013 |
| WO | WO2015106978 | 7/2015 |

OTHER PUBLICATIONS

Unknown Author, "Application Aware Network Performance Monitoring", www.appneta.com/network-performance-management/, extracted on Jul. 10, 2013, pp. 1-2.

Unknown Author, "Controlling LXI Instrumentation With Smart Devices >> Evaluation Engineering", www.evaluationengineering.com/search/article.php?aid=3549&nfr=35714.384321.02, extracted on Jul. 10, 2013, pp. 1-4.

Unknown Author, "LXI in Cloud Computing for Test and Measurement >> Evaluation Engineering," www.evaluationengineering.com/articles/201304/ixi-in-cloud-computing-for-test-and-measurement.php, extracted on Jul. 10, 2013, pp. 1-5.

Rowe, Martin, "Mobile apps: The next engineering tool", EDN, http://www.edn.com/design/test-and-measurement/4368779/Mobile-apps-The-next-engineering-tool, dated Dec. 12, 2011, pp. 1-3.

Unknown Author, "Smart Device Programming Tools and Examples for Instrument Control", Agilent Technologies, www.home.agilent.com/agilent/software.jspx?cc=CA&lc=eng&key=2075645&nid=35714 384321.02&id=2075645&cmpid=zzfindsmartdevice, extracted on Jul. 10, 2013, pp. 1-2.

Unknown Author, "Smartphone App Improves Blood Test Technology", Laboratory Equipment, http://www.laboratory equipment.com/news/2012/09/smartphone-app-improves-blood-test-technology, extracted on Jun. 26, 2013, pp. 1-2.

Unknown Author, Pathview Appliances datasheet 2012, AppNeta, extracted on Jul. 10, 2013, pp. 1-2.

Unknown Author, "FTB-880 NetBlazer Multiservice Tester", FTB-880_9-angHR.pdf, dated Aug. 2013, pp. 1-23.

* cited by examiner

NETWORK TEST SYSTEM

PRIORITY STATEMENT UNDER 35 U.S.C. §119 (E) & 37 C.F.R. §1.78

This non-provisional patent application claims priority based upon the prior U.S. provisional patent applications entitled "NETWORK TEST SYSTEM", application No. 61/911,495, filed Dec. 4, 2013, in the name of EXFO INC, from inventors LAPIERRE, Dominic; GIGUERE, Bruno; NADEAU, Sylvain; and BUTEAU, Gilles.

TECHNICAL FIELD

The present invention relates to network testing and, more specifically, to scalable test instruments and test methods.

BACKGROUND

Contemporary network deployment and testing methodologies rely on dedicated test equipment (portable or rack mount) deployed at specific locations, e.g., throughout an Ethernet network. The test equipment comprises specialized devices that require a high level of customization. In addition, performance and service assurance testing on network services are very demanding in terms of processing capacity. Tests that can be executed using test equipment are often limited by its processing capacity.

The present invention addresses a need for more scalable test equipment.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect is directed to a test system that comprises a test processing agent and a local test device. The test processing agent serves to process test measurements, related to a network-under-test, into test results. The test processing agent is decoupled from the network-under-test. The local test device comprises a firmware module and a network interface (NI) module. The firmware module depends on external instructions for initiating a test sequence on the network-under-test. The NI module comprises at least one physical port connectable to the network-under-test. The physical port is used for initiating the test sequence. The test processing agent receives the test measurements following the initiation of the test sequence by the local test device and allows access to the test results.

Optionally, the test processing agent may run on a virtualized computing system, e.g., where the processing unit or processor may be a cluster of computers or a single computer running multiple virtual machines.

The test processing agent may optionally comprise a cloud-based application having dynamically assigned computing resources to support a variable number of test devices.

The test processing agent may also optionally use the network-under-test to send the external instructions to the local test device.

As another option, the NI module may further comprise at least one local interface connectable to a local terminal temporarily co-located with the local test device. The local interface receives the external instructions from the local terminal. In addition, the local interface may further allow the local test device to communicate with the test processing agent via the local terminal. The local interface may further be a local wireline interface or a local wireless interface for example.

Optionally, the NI module may further comprise at least one Wide Area Network (WAN) interface that connects towards the test processing agent. The test processing agent and the local test device may then communicate through the WAN interface with the local terminal that is temporarily co-located with the local test device. The WAN interface may be a cellular network interface.

In one scenario, the network-under-test, or a service on the network-under-test, is being turned up. The external instructions may then comprise an initial configuration for the at least one physical port to connect to the network-under-test.

The test processing agent may optionally send the external instructions through the local terminal.

The firmware module may further be adapted to initiate the test sequence without the local terminal being connected to the local interface. As another option, the test processing agent may further receive, from the local terminal, a request to download the test results while the local test device is disconnected from the local terminal.

The local terminal may be a smart device.

The test system may further comprise one or more additional test devices. The one or more additional test devices may be remote from the local test device or co-located with the local test device. The one or more additional test devices are connected to the network-under-test and the local test device and the additional test devices are synchronized.

Optionally, the synchronization may be performed with each other using, as a reference point, at least one of the test processing agents, a plurality of satellite signals, or a grandmaster reference source. The local test device and the additional test devices may further be arranged into at least one test group for the network-under-test.

As yet another option, the physical port of the local test device and a physical port of each of the additional test devices may be used as multiple ports of a single test instrument of the network-under-test. The test processing agent may further initiate a test command over the single test instrument. The test command would then comprise the test sequence and at least one additional test sequence initiated from the additional test devices. Each of the additional test devices may further receive additional external instructions for initiating the additional test sequences. The test processing agent may further send the additional external instructions to the additional test devices for initiation of the additional test sequences.

A second aspect is directed to a method for obtaining test results for a network-under-test. The method comprises receiving, in a firmware module of a local test device connectable to the network-under-test via a physical port, external instructions for initiating a test sequence on the network-under-test. The test sequence leads to the production of test measurements. The firmware module cannot initiate the test sequence without the external instructions and cannot process the test measurements into the test results. Following the initiation of the test sequence by the local test device, the method also comprises receiving the test measurements at a test processing agent decoupled from the network-under-test, and then processing the test measurements into the test results with the test processing agent. The test processing agent allows access to the test results.

Optionally, the method comprises executing the test processing agent as a distributed software application over a virtualized computer system having configurable and scalable processing capabilities.

The method may further comprise sending, from the test processing agent, the external instructions to the local test device via the network-under-test.

The local test device may also comprise at least one local interface connected to a local terminal temporarily co-located with the local test device. The method may then further comprise receiving the external instructions from the local terminal over the local interface and communicating between the local test device and the test processing agent via the local terminal.

Optionally, the method comprises communicating between the local test device and the test processing agent through a Wide Area Network (WAN) interface and communicating between the local test device and a local terminal temporarily co-located with the local test device through the WAN interface.

In another scenario, the network-under-test is being turned up. The method may then further comprise connecting the physical port to the network-under-test using an initial configuration from the external instructions.

The method may also further comprise sending the external instructions from the test processing agent to the local terminal, disconnecting the local terminal from the local test device while the test sequence runs on the network-under-test and/or receiving, at the test processing agent from the local terminal, a request to download the test results while the local test device is disconnected from the local terminal.

At least one additional test device remote from the local test device may further be connected to the network-under-test. The local test device and the additional test device may be synchronized.

Optionally, the method may comprise synchronizing the local test device and the additional test device with each other using, as a reference point, the test processing agent, a plurality of satellite signals, and/or a grandmaster reference source. The method may also comprise grouping the test device and the additional test devices into at least one test group for the network-under-test.

As yet another option, the method may comprise using the physical port of the local test device and a physical port of each of the additional test devices as multiple ports of a single test instrument of the network-under-test. The method may also comprise initiating, from the test processing agent, a test command over the single test instrument. The test command would then comprise the test sequence and at least one additional test sequence initiated from the additional test devices. The method may then also comprise receiving, in each of the additional test devices, additional external instructions for initiating the additional test sequences. The test processing agent may further send the additional external instructions to the additional test devices for initiation of the additional test sequences.

BRIEF DESCRIPTION OF THE DRAWINGS

Further features and exemplary advantages of the present invention will become apparent to the skilled person from the following detailed description, taken in conjunction with the appended drawings, in which.

DETAILED DESCRIPTION

Figure 1:
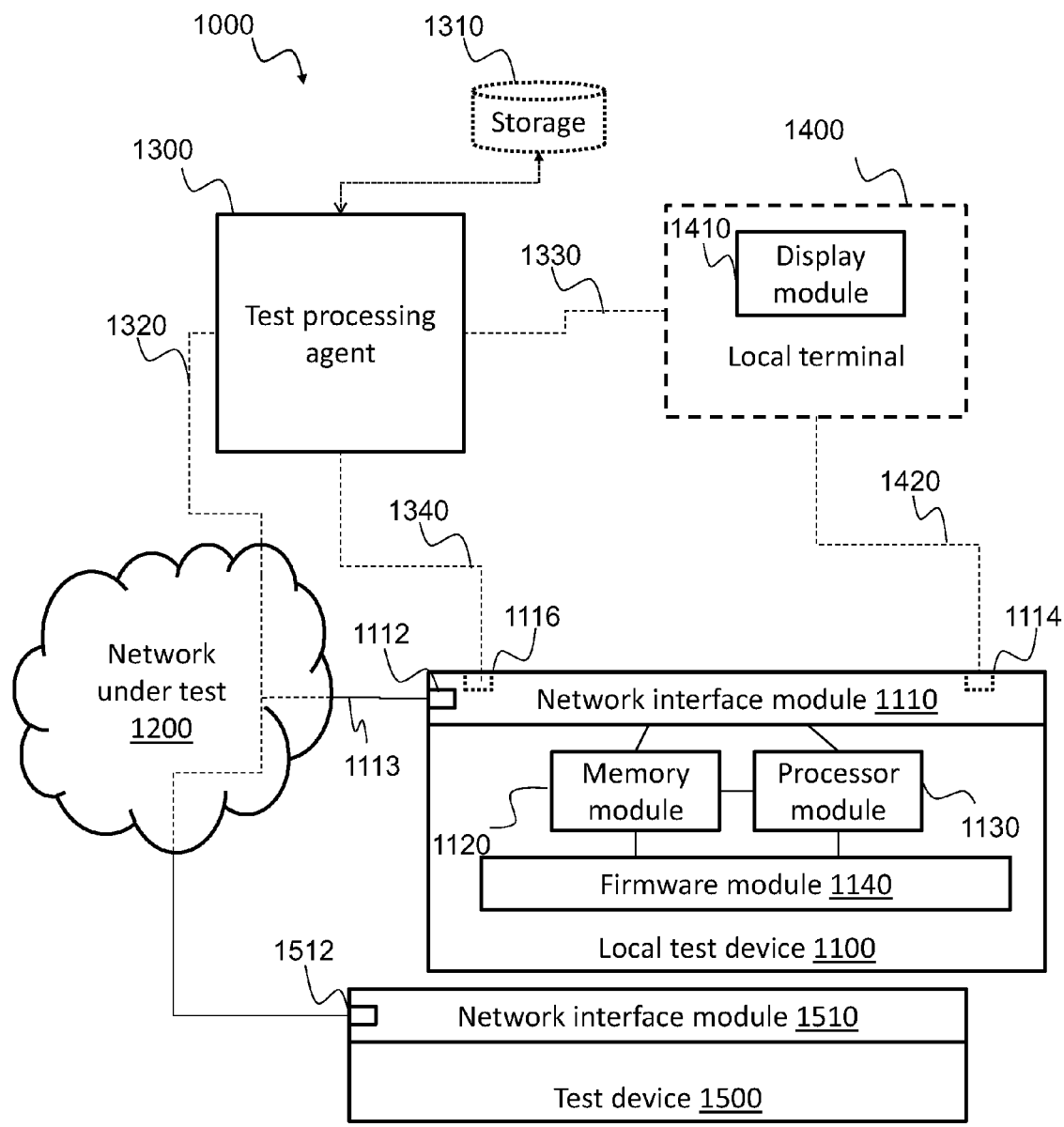
FIG. 1 is a modular representation of the test system in accordance with an exemplary embodiment.

There is provided a test system and related method where test measurements are processed on a test processing agent remote from a local test device. Depending on the choices made in its implementation, the test system aims at providing at least one exemplary advantage such as having test devices that can run on low-cost hardware, having a scalable test system by adding or removing test devices, providing a test instrument with a varying number of ports by grouping test devices together and/or providing adjustable processing power by utilizing distributed processing/virtualized hardware (e.g., cloud-based or cluster-based) for running the test processing agent.

For instance, while a network or network link (herein after referred to as the network-under-test) is being turned up, testing methodologies typically rely on test equipment (portable or rack mount) that has fixed capabilities. In order to provide a more cost effective solution during network turn-up, a solution may be to use test instruments with capacities that can be scaled with the network. For instance, it may be advantageous to be able to add physical ports to a test instrument, or add processing power to process test measurements gathered through the network-under-test into test results. As the network turn-up progresses, the test instrument could be reconfigured by allocating more test devices to the test system (e.g., increasing the number of test devices associated to a group) or by reallocating them from one physical location to another.

In one embodiment, test hardware is physically dissociated from the processing and from the graphical user interface (GUI). The processing agent is also decoupled from the network under test. In the present context, a device is "decoupled" from a network-under-test when the device is not reachable over the network-under-test, its reach involving at least a network communication link distinct from the network being tested (e.g., involving communication over the internet). The processing power and the test instrument software (or test processing agent) may be moved to a cloud computing service, whereas the test hardware is provided in a plurality of distinct single-port "thin" test devices. The cloud computing service could be a privately-owned central computing facility in one or more physical locations. The GUI may be provided by a local terminal such as an off-the-shelf smart phone, tablet or portable computer (herein referred to as "smart device") that connects to the cloud-based software. A scalable test instrument may then be created by grouping the needed number of individual test devices. The test devices may perform traffic generation and real-time traffic analysis, and provide the collected data (or test measurements) to the test processing agent, in the cloud. The test measurements may be provided through side connectivity (e.g., cellular/mobile connection, Local Area Network (LAN), Wireless LAN, via the network-under-test, Wide Area Network (WAN), etc.). The smart device, e.g., via a dedicated application or a web server running in the test device, may also configure the test device for the specific test or test sequence to be performed. The test measurements may also be provided through a connection with the smart device towards the test processing agent (e.g., wireline (USB, Ethernet, etc.), wireless (WLAN, Bluetooth®), etc.).

In one embodiment, the test device provides only real time processing and local connectors. The test device may be a single unit without modularity and without embedded GUI. The test device is minimally equipped with hardware/firmware in order to accumulate or cache information (e.g., test measurements) as connectivity may not always be available or fast enough to export data in real-time back to the test processing agent.

The test device may be equipped with various management port technologies: WLAN, Bluetooth®, RJ-45, 3G cellular, 4G cellular or LTE, etc. to allow connectivity back to the test processing agent, which may be located in the cloud. The connectivity may be adaptive as it may use a parallel network or even the network-under-test to communicate with the test processing agent.

In one embodiment, the test processing agent may be seen as a virtualized evolution of the software module that would normally run on the platform of a typical test module. The virtualization (e.g., in the cloud) between the test processing agent and the test device facilitates scalability of processing power. In this exemplary embodiment, the test processing agent is hosted in a virtual machine running in the cloud. The processing capabilities or processing power of the test processing agent is adjustable by the inherent characteristics of a virtual machine. Of course, the processing agent may also be hosted on a single computer. In this case, the processing software may be multithreaded or not. Since the test processing agent will typically run as a service on cloud resources, it may be accessed via commodity devices such as smart phones, tablets, personal computers and others (which may encompass the smart device previously defined, or a different device).

In one embodiment, the test devices (or test modules, test units) are seen as resources available to perform one or more tests or test sequences on the network-under-test. The test processing agent can bundle or group the appropriate number of test devices into one or more test instruments to achieve the scalability needed. In the context of this example, scalability is achieved by grouping a variable number of test devices in the virtual test instrument. The need for a conventional test device with multiple ports is diminished, as deploying additional test devices into the virtual test instrument provides the desired scalability. As such, in one embodiment, a test device comprising one and only one test device is sufficient.

A synchronization mechanism may be required between the test processing agent in the cloud and the local test devices, especially when more than one local test device is used. Synchronization aims at ensuring that the test is started (i.e. initiated) at the same time (or at a known relative delay) among all local test devices that are part of a group to which the test is assigned. Synchronization may also further be required such that the analysis (or processing) is performed on a common time base. The synchronization may also further be required such that the test measurements carried out on each test devices (e.g., time stamping, traffic filtering, etc.) is performed on the common time base. The synchronization mechanism may be based on existing time and synchronization protocols such as NTP, SNTP, PTP (e.g., IEEE 1588) and/or satellite signals and/or other positioning/timing signals that allow synchronization based thereon.

In some embodiments, the synchronization mechanism involves exchanging different messages between test devices part of a group to which a synchronized test is assigned and/or exchanging different messages between the test processing agent and the test devices of a test instrument. For instance, a synchronized test may involve one or more sync messages comprising a clock value (e.g., for synchronizing internal clocks), a start time indicator and an end time indicator for the synchronized test. This allows a test that requires the use of a plurality of test devices to start and/or end simultaneously or sequentially on the involved test devices. The test measurements may also be time stamped according to the common time reference (e.g., provided by the clock value). This allows test measurements obtained from different test devices of a group to be analyzed by the test processing agent on a common time base. The synchronization of the internal clocks of multiple test devices may be performed using, as a reference point, at least one of the test processing agents 1300, a plurality of satellite signals (not shown), or a grandmaster reference source (not shown).

In one embodiment, test devices do not necessarily need to be co-located. For instance, two or more local test devices can be distributed in or at the boundaries of the network-under-test at more than one location (e.g., on both ends of the network service to be tested), offering dual-ended (e.g., bidirectional) testing capability. Another possible advantage with the proposed exemplary approach is that a single user interface (e.g., co-located with one of the local test devices at one of the locations) may be used for controlling the local test devices at each of the locations (e.g., sending test command(s), initiating test sequence(s), etc.). For instance, a bidirectional test sequence may be concurrently initiated at both ends of the network service being tested on the network-under-test, eliminating the need to have different users (or test technicians) concurrently at both ends when the test is initiated.

Reference is now made to the drawings. FIG. 1 shows a modular representation of the test system 1000 in accordance with an exemplary embodiment. The test system 1000 comprises a local test device 1100 connectable to a network-under-test 1200. A test processing agent 1300 can communicate with the test device 1100 through a network interface module (NI) 1110.

As can be appreciated in FIG. 1, the test processing agent 1300 is decoupled from the network-under-test 1200. In the present context, "decoupled" has the meaning of not being reachable over a link entirely comprised within the network-under-test 1200, but may be accessed in an alternative fashion, for instance by means of a network communication link distinct from the network-under-test 1200 (e.g., the internet). As depicted in the example of FIG. 1, the test processing agent 1300 is reachable through a network communication link (e.g., 1320, 1330 and/or 1340) that is distinct from a link (e.g., 1113) between the test device 1100 and the network-under-test 1200. In addition to the NI module 1110, the local test device 1100 comprises a firmware module 1140. The firmware module 1140 depends on external instructions for initiating a test sequence on the network-under-test 1200. More specifically, the firmware module 1140 does not provide the functionality of processing test measurements into test results. The NI module 1110 comprises at least one physical port 1112 to be connected (or connectable) to the network-under-test 1200. The physical port 1112 is used for initiating the test sequence in the network-under-test 1200.

The test processing agent 1300 receives the test measurements following the initiation of the test sequence by the local test device 1100, processes the test measurements into test results and thereafter allows access to the test results. In the example of FIG. 1, the test processing agent 1300 is considered to run on a virtualized computing system (not explicitly depicted). The processing unit or processor of the test processing agent 1300 may be provided by a cloud computing service, a cluster of computers or a single computer (e.g., running multiple virtual machines with or without a multithreaded software application) which may dynamically allocate the necessary resources to the test processing agent 1300. The purpose, in the example of the virtualized computing system, is to be able to dynamically adjust processing capabilities in view of the processing required by the actual test being performed (which depends on different parameters such as the number of tests, the number of test devices in a test, etc.).

The communication between the test device 1100 and the test processing agent 1300 may occur through the network interface module (NI) 1110 directly, e.g., via the network-under-test 1200 (e.g., links 1320 and 1113) or a Wide Area Network (WAN) interface 1116 of the NI module 1110 (e.g., via link 1340), or indirectly, e.g., through an optional local terminal 1400 (e.g., via links 1330, the local terminal 1400 and link 1420). The WAN interface 1116 could be based on Ethernet or other wireline protocol or could be a wireless interface (e.g., 3G, WiMax, 4G/LTE cellular network, etc.). Skilled persons will readily understand that the depicted links (e.g., 1113, 1320, 1330, 1340, 1420, etc.) represent logical connections and that different network nodes (e.g., routers, switches, etc.) may be present thereon.

In one embodiment, the NI module 1110 comprises at least one local interface 1114 connectable to the local terminal 1400. In order for the local connection 1420 to occur therebetween, the local terminal 1400 should be at least temporarily co-located with the local test device 1100 such that they can communicate via the local wireless or wireline interface 1114. The local terminal 1400 is thus brought at least temporarily to the site or location where the local test device 1100 is located. The local interface 1114 may then receive the external instructions from the local terminal 1400. In addition, the local interface 1114 may further allow the local test device 1100 to communicate with the test processing agent 1300 via the local terminal 1400 (e.g., via the link 1330). The local interface 1114 may be a local wireline interface (USB, FireWire®, Ethernet, etc.) or a local wireless interface (Near Field Communication (NFC), Bluetooth®, Wi-Fi™, etc.).

In one exemplary embodiment, the network-under-test 1200, or a service on the network-under-test 1200, is being turned up (e.g., by enabling a network link that was previously inactive or deploying new network service on an existing link). The external instructions may then comprise an initial configuration for the at least one physical port 1112 to connect to the network-under-test 1200. For instance, it may not be possible for the at least one physical port 1112 to connect to the network-under-test without the initial configuration.

The external instructions, in one embodiment, are generated at the test processing agent 1300. The external instructions generated at the test processing agent 1300 may, however, be generated based on input from the local terminal 1400. An alternative would be to generate at least a portion of the external instructions directly at the local terminal 1400. Such an alternative may, for instance, allow configuration of the test device 1100 such that it becomes visible to the test processing agent 1300. A remaining portion of the external instructions may then be generated by the processing agent 1300.

The firmware module 1140 may be able to initiate the test sequence on the network-under-test 1200 without being connected to the local terminal 1400 or the test processing agent 1300. Indeed, in one example, once the external instructions are received and registered (e.g., in the memory module 1120) by the local test device 1100, the firmware module 1140 is able to initiate the test sequence and gather (e.g., store or accumulate in the memory module 1120) at least some of the test measurements required by the test processing agent 1300. The gathered test measurements will have to be transmitted to the test processing agent 1300 eventually, which could happen via any of the connections discussed previously (e.g., 1320, 1340 or 1420 and 1330). In one embodiment, the processing performed by the firmware module 1140 on the collected test measurements is limited to deciding whether a test measurement should be transmitted or not, the sophisticated processing being delegated to the test processing agent 1300. Consequently, the test device 1100 requires only low-cost and basic hardware to operate. Upon receiving the external instructions, the test device 1100 initiates the test sequence, collects (e.g., stores or accumulates in the memory module 1120) test measurements characterizing at least part of the network-under-test 1200 and transmits the collected test measurements to the test processing agent 1300 for further processing if/when a window of opportunity is present (e.g., avoiding using the network-under-test 1200 while a sensitive test sequence is running and/or if the logical communication with the test processing agent 1300 is temporarily interrupted).

In some embodiments, the test processing agent 1300 is expected to be responsible for the following exemplary tasks related to the test results that the test device 1100 is not expected to be able to perform:

(a) Providing a verdict assessment whereby performance is compared to pre-defined thresholds and a pass/fail verdict is provided as part of the test results;

(b) Generating formatted test results (e.g., using Portable Document Format (PDF));

(c) Deriving statistics as part of the test results such as TCP Efficiency (difference between number of transmitted bytes and the number of retransmitted bytes, divided by the number of transmitted bytes), which is an example of dynamic statistics recalculated periodically (e.g., each second) as test measurements (e.g., new counters) are received;

(d) Providing long-term averages on test measurements values as part of the test results;

(e) Correlating test events (e.g., correlating that an alarm was raised at a certain time and then cleared at another time and including the time difference in the test results);

(f) Providing a hierarchy of different alarms as part of the test results whereby certain alarms caused by others are masked, which typically requires a set of complex rules;

(g) Graphing a result over time as part of the test results;

(h) Pushing the test results or a subset of the test results in another higher management system;

(i) Making long-term trends as part of the test results; and/or (j) Providing a troubleshooting aid over the test results (e.g., an expert system that interprets apparently unrelated results and draws a conclusion on the possible cause of the problem).

Once the test processing agent 1300 has processed the test measurements into the test results, the test processing agent 1300 may receive, e.g., from the local terminal 1400 or any other computer or terminal, a request to download the test results. Skilled persons will understand that the local test device 1100 does not need to be reachable from the test processing agent 1300 and/or the local terminal 1400 for the download to take place.

The test system 1000 may further comprise one or more additional test devices (1500). Although only one additional test device 1500 is shown in FIG. 1, a skilled person will understand that the number of devices 1500 will be dictated by the context of the required test/expected test results. The one or more additional test devices 1500 may be remote from the local test device or co-located with the local test device 1100 (not explicit in FIG. 1). The one or more additional test devices 1500 are connected to the network-under-test 1200. The local test device 1100 and the additional test devices are synchronized operationally and may further be synchronized for different measurements. In one embodiment, one additional test device 1500 is connected to the network-under-test 1200 remotely from local test device 1100 and the two test devices are further arranged (by the test processing agent 1300) in a group to cooperate in order to perform dual-ended measurements such as bidirectional or dual-ended unidirectional latency measurement (in which case the internal clocks (not shown) would also be synchronized). This configuration may also be employed to specifically test a segment of the network-under-test 1200, which may allow isolating a potential problem on the network.

In one embodiment, a plurality of test devices (1100, 1500, . . . ) are distributed in the network-under-test 1200. Network connections between each of the distributed test devices (1100, 1500, . . . ) are defined as testable segments. The testable segment, in that context, may be seen as defining the test granularity of the network-under-test 1200. A given test may be segmented by the test processing agent 1300 based on the testable segments. The test processing agent 1300 would then send specific external instructions to some or to all of the plurality of test devices (1100, 1500, . . . ) for initiating a plurality of test sequences on the testable segments. Test measurements would then be received by the test processing agent 1300 based on the granularity provided by the presence of the distributed test devices. The test results related to the given test may thus include segment results related to each of the testable segments. As a skilled person will readily appreciate, the use of lower cost test devices that typically do not systematically require physical presence of a test technician at their location likely improves the test granularity of the network-under-test 1200.

In another embodiment, the physical port 1112 of the local test device 1100 and a physical port 1512 of each of the additional test devices 1500 are used as multiple ports of a single test instrument of the network-under-test 1200. The test devices 1100 and 1500 may then be referred to as a group of test devices comprised in the single test instrument. The test processing agent 1300 can initiate a test command over the single test instrument. The test command would then comprise at least the test sequence and may also comprise at least one additional test sequence initiated from the additional test devices 1500. Each of the additional test devices 1500 may also receive additional external instructions for initiating the additional test sequences (e.g., from the test processing agent 1300, via the local terminal 1400 and/or a different terminal (not shown)). The internal clock synchronization, if performed, could further allow multiple local test devices to cohesively operate to generate data that a single device would not be able to generate alone (e.g., a large number of smaller streams generated in respective test devices, or a large stream of data that is generated by combining a number of smaller streams generated in respective test devices).

In one embodiment, the local test device 1100 including its firmware module 1140 is configured to be compatible with different test methodologies when used in conjunction with an additional test device 1500 remotely located from the local test device 1100 and the test processing agent 1300. The test methodologies could be standardized or proprietary. Examples of standardized test methodologies include, but is not limited to:

(a) EtherSAM (ITU-T Y.1564) test suite for turning up and troubleshooting mobile backhaul and business Ethernet services;
(b) throughput, back-to-back, latency and frame-loss measurements as per RFC 2544; and
(c) stateful TCP throughput test as per RFC 6349.

The local test device 1100 including its firmware module 1140 may also be configured for testing specific network environments when used in conjunction with an additional test device 1500 remotely located from the local test device 1100 and the test processing agent 1300. Examples of specific network environments include, but is not limited to:

(a) Multistream generation and analysis;
(b) Bit Error Rate Testing (BERT) and analysis;
(c) TCP/IP (IPv4, IPv6) testing and analysis;
(d) IPTV testing and analysis;
(e) Carrier Ethernet testing and analysis; and
(f) Carrier Ethernet Operation Administration and Management (OAM) testing and analysis.

Of course, in a multi-port configuration, each one of the local test devices 1100/1500 corresponding to the multiple ports is capable of performing the above network performance tests (together with the test processing agent 1300 and a remote test device).

FIG. 1 also shows a processor module 1130 and a memory module 1120 of the test device 1100 (e.g., for managing a buffer for the test measurements, providing a basic instruction set, etc.). The processor module 1130 may represent a single processor with one or more processor cores or an array of processors, each comprising one or more processor cores. It will be understood that the test device may be implemented to employ Field-Programmable Gate Array (FPGA) technologies. In this case, the processor module may be provided apart from the FPGA circuit or integrated with the FPGA circuit (completely or partly). The firmware module 1140 typically comprises executables instructions that, when executed, cause the test device 1100 to perform its assigned tasks (e.g., initiating a test sequence on the network-under-test). The executable instructions may be stored in the memory module 1120 or may be stored independently therefrom. The executable instructions are meant to be executed on the processor module 1130 which will also likely require different accesses to the memory module 1120. The executable instructions may also be comprised in a dedicated portion of the processor module 1130 (e.g., when implemented in FPGA technologies). The memory module 1120 may comprise various types of memory (different standardized or kinds of Random Access Memory (RAM) modules, memory cards, Read-Only Memory (ROM) modules, programmable ROM, etc.). The network interface module 1110 represents at least one physical interface that can be used to communicate with other network nodes. The network interface module 1110 may be made visible to the other modules of the test device 1100 through one or more logical interfaces. The actual stacks of protocols used by the physical network interface(s) and/or logical network interface(s) of the network interface module 1110 do not affect any of the exemplary embodiments described herein. The variants of processor module 1130, memory module 1120, and network interface module 1110 usable in the context of the exemplary embodiments will be readily apparent to persons skilled in the art. Likewise, even though explicit mention of the memory module 1120 and/or the processor module 1130 is not made throughout the description of the various examples, persons skilled in the art will readily recognize that such modules are used in conjunction with other modules of the test device 1100 to perform routine as well as innovative steps related to the present invention.

Figure 2:
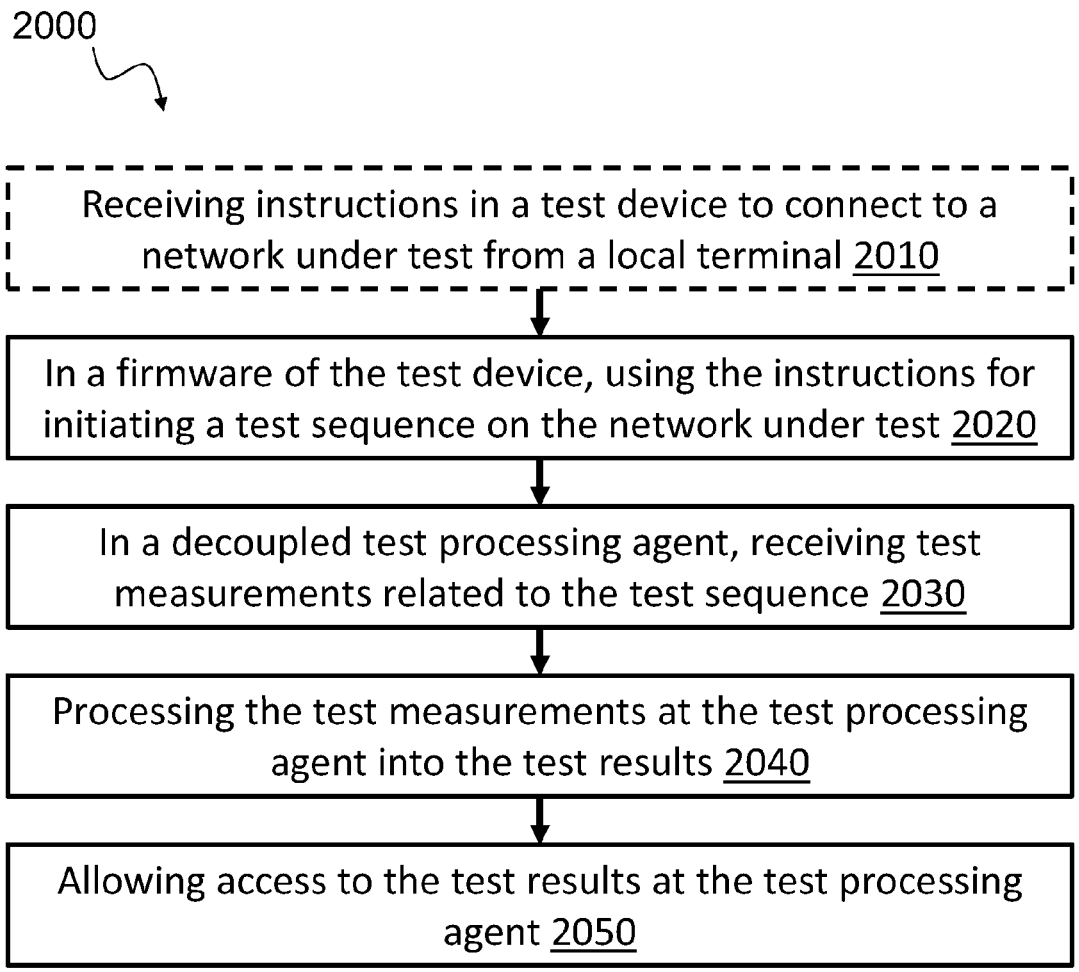
FIG. 2 is a flow chart of an exemplary method in accordance with an exemplary embodiment.

FIG. 2 shows a flow chart of an exemplary method 2000 for obtaining test results for a network-under-test in accordance with an exemplary embodiment. In one embodiment, the method 2000 begins with receiving, in a firmware module of a local test device, external instructions for connecting to the network-under-test via a physical port (2010). The instruction to connect 2010 may not be necessary in all embodiments as the local text device may, for instance, be able to detect the required configuration and/or may be pre-loaded with the necessary configuration for the connection to occur. The external instructions cause the test device to initiate a test sequence on the network-under-test (2020). The test sequence leads to the production of test measurements. The firmware module cannot initiate the test sequence without the external instructions and cannot process the test measurements into the test results. Note that a distinction exists between the test measurements provided by the local test device and the test results provided by the test processing agent. More specifically, the test results provide a useful metric for the network-under-test, whereas the test measurements are typically only intermediate values from which it is difficult, if not impossible, to draw conclusion regarding the network-under-test. For instance, the test results may be used by the test technician, the network operator and eventually the end-customer (e.g., the entity that lease the network link being turned-up). The test results may be formatted differently depending on the intended recipient. For instance, test technician may review the test results over a Graphical User Interface (GUI) whereas the end-customer may receive a Portable Document Format (PDF) report (or another form of electronic report, sometimes called a birth certificate of the network-under-test or a part thereof).

The method 2000 also comprises receiving, at a test processing agent decoupled from the network-under-test, the test measurements following the initiation of the test sequence by the local test device 2030 and processing, at the test processing agent, the test measurements into the test results 2040. The test processing agent allows access to the test results 2050.

Figure 3:
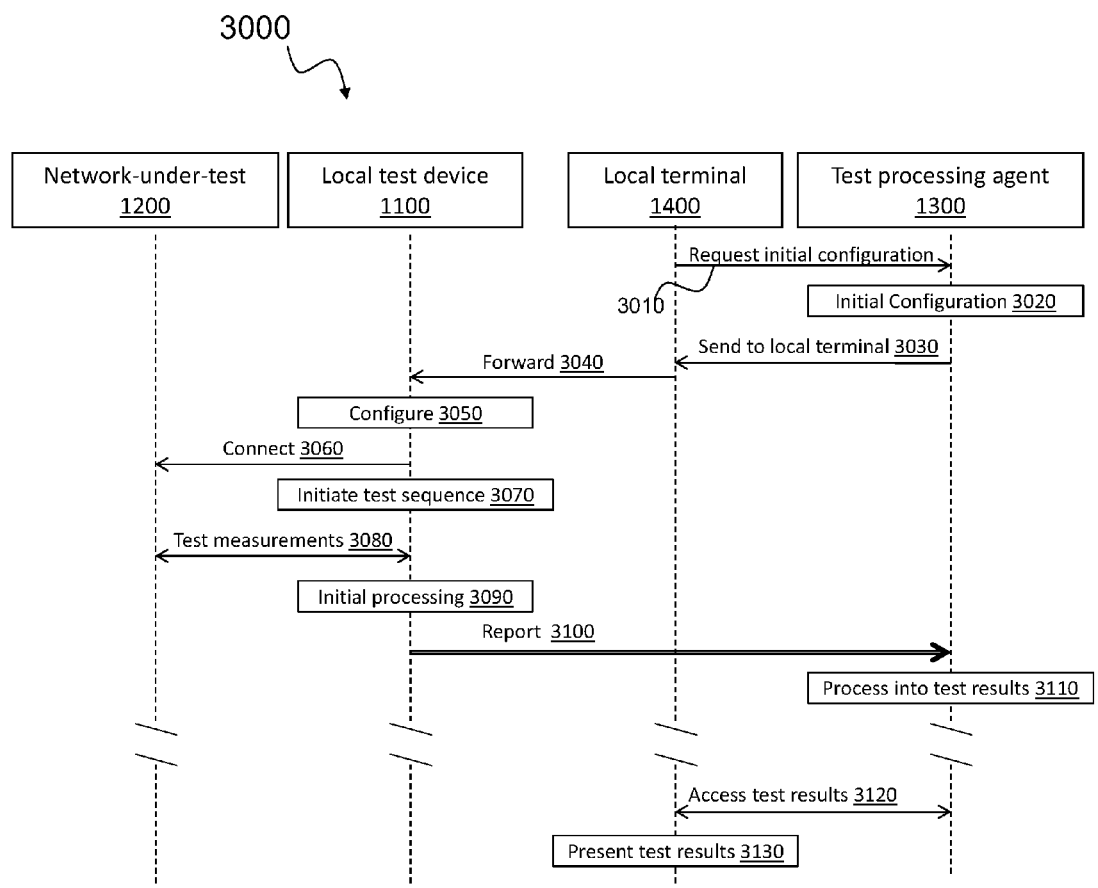
FIG. 3 is an exemplary nodal operation and flow chart diagram in accordance with an exemplary embodiment.

FIG. 3 shows a nodal operation and flow chart diagram 3000 in accordance with an exemplary embodiment. In this exemplary embodiment, the local test device 1100 is either not connected to the network-under-test 1200 or does not have access to a service to be tested on the network-under-test 1200. The service to be tested on the network-under-test 1200, or the network-under-test 1200 itself, may have to be turned up or credentials may be required to connect or gain access thereto. As such, in this exemplary embodiment, the local test device 1100 requires an initial configuration. The local terminal 1400, temporarily co-located with the local test device 1100, requests (3010) an initial configuration 3020 from the test processing agent 1300 for the local test device 1100. The initial configuration 3020 is sent back to the local terminal 1400 (3030) before being forwarded (3040) (or otherwise applied) to the local test device 1100.

In another embodiment, the initial configuration 3020 could be sent directly to the local test device 1100. The local test device 1100 uses (3050) the initial configuration to connect (3060) to the network-under-test 1200. The local test device 1100, in order to use the initial configuration, may require interactions with the local terminal 1400 (not shown). The initial configuration may also provide the necessary information for the local test device 1100 to connect to the test processing agent 1300 via the network-under-test 1200 together with another network communication link (not shown) allowing communication with the test processing agent 1300 (e.g., the internet). The local test device 1100 then initiates the test sequence 3070. In one embodiment, the external instructions are received from the local terminal 1400 (not shown on FIG. 3). In another embodiment, the external instructions are received from the test processing agent 1300 via the network-under-test 1200 (not shown on FIG. 3). In this later exemplary scenario, the local test device 1100 may continue to receive external instructions from the test processing agent 1300 even if the local terminal 1400 is no more reachable (e.g., has left the site where the local test device 1100 is installed). After the test sequence has been initiated, test measurements are collected (3080) characterizing the network-under-test 1200 and initial processing (3090) is performed on the test measurements at the local test device 1100. By performing this initial processing 3090 locally, one avoids having to send all raw collected data characterizing the network-under-test 1200 over to the test processing agent 1300. The test measurements are then reported (3100) back to the test processing agent 1300. In the depicted embodiment, the report 3100 is sent to the test processing agent 1300 via the network-under-test 1200, but a skilled person will readily understand that the report 3100 could be sent to the test processing agent 1300 through other routes, such as through the local terminal 1400. The test processing agent 1300 further processes (3110) the reported test measurements into test results. At a later time, once the test measurements have been processed into the test results, the local terminal 1400 can obtain the test results (3120) from the test processing agent 1300. It should be readily understood that any other device (not shown) may be used to obtain the test results (e.g., a desktop computer from the network-under-test's operator). The test results may then be presented (3130) to the user on the requesting device (e.g., the local terminal 1400).

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A test system for obtaining test results characterizing at least part of a network-under-test, the system comprising:
   a local test device comprising:
      a firmware module that initiates a test sequence on the network-under-test only following receipt of external instructions therefor, the test sequence leading to the production of test measurements related to the network-under-test and unrelated to performance of the local test device, wherein the firmware module cannot process the test measurements to provide the test results and wherein the external instructions are received over a local interface of the local test device connected to a local terminal temporarily co-located with the local test device; and
      a network interface (NI) module comprising the local interface and at least one physical port connectable to the network-under-test, the at least one physical port being used for initiating the test sequence;
   a test processing agent, decoupled from the network-under-test for:
      sending to the local terminal, prior to the external instructions being received at the local device, at least a portion of the external instructions for initiating the test sequence on the network-under-test, the test sequence leading to the production of the test measurements related to the network-under-test;
      receiving the test measurements following the initiation of the test sequence by the local test device;
      processing the test measurements related to the network-under-test into the test results; and
      allowing access to the test results.

2. The test system of claim 1, wherein the test processing agent runs on a virtualized computing system, the computing system comprising a plurality of processor modules.

3. The test system of claim 2, wherein the test processing agent comprises a cloud-based application having dynamically assigned computing resources to support a variable number of test devices.

4. The test system of claim 1, wherein the NI module comprises at least one Wide Area Network (WAN) interface to be connected towards the test processing agent, wherein the test processing agent is further for communicating with a local terminal, temporarily co-located with the local test device, through the WAN interface.

5. The test system of claim 1, wherein the test processing agent is operable to send the external instructions, toward the local test device, through the local terminal.

6. The test system of claim 1, wherein the firmware module is adapted to initiate the test sequence without the local terminal being connected to the local interface.

7. The test system of claim 1 further comprising at least one additional test device connected to the network-under-test and synchronized with the local test device, wherein the at least one additional test device is capable of operating either:
   remote from the local test device; or
   co-located with the local test device.

8. The test system of claim 7, wherein the at least one additional test device and the local test device are synchronized with each other using, as a reference point, at least one of the test processing agents, a plurality of satellite signals, or a primary/grandmaster reference source.

9. The test system of claim 7, wherein the local test device and the at least one additional test device are arranged into at least one test group for the network-under-test.

10. The test system of claim 7, wherein the physical port of the local test device and a physical port of each of the at least one additional test device are being used as multiple ports of a single test instrument of the network-under-test.

11. The test system of claim 10, wherein the test processing agent is operable to initiate a test command over the single test instrument, the test command comprising the test sequence and at least one additional test sequence to be initiated by the at least one additional test device.

12. The test system of claim 11, wherein the test processing agent sends additional external instructions to the at least one additional test device for initiation of the at least one additional test sequence.

13. A method for obtaining test results for a network-under-test, the method comprising:
   sending, from a test processing agent to a local terminal, at least a portion of external instructions for initiating a test sequence on the network-under-test, the test sequence leading to the production of test measurements related to the network-under-test;
   receiving, in a firmware module of a local test device connectable to the network-under-test via a physical port, the external instructions over a local interface of the local test device connected to the local terminal temporarily co-located with the local test device, wherein the test measurements are related to the network-under-test and unrelated to performance of the local test device, the firmware module cannot initiate the test sequence without the external instructions and cannot process the test measurements into the test results;
   receiving, at a test processing agent decoupled from the network-under-test, the test measurements following the initiation of the test sequence by the local test device;
   processing, at the test processing agent, the test measurements into the test results; and
   allowing access to the test results at the test processing agent.

14. The method of claim 13, further comprising executing the test processing agent as a cloud-based software application having dynamically assigned computing resources to support a variable number of test devices.

15. The method of claim 13 further comprising communicating between the local test device and the test processing agent via the local terminal.

16. The method of claim 13 further comprising:
   communicating between the local test device and the test processing agent through a Wide Area Network (WAN) interface; and
   communicating between the local test device and the local terminal temporarily co-located with the local test device through the WAN interface.

17. The method of claim 13, wherein at least one additional test device is connected to the network-under-test and synchronized with the local test device, the at least one additional test device being capable of operating either:
   remote from the local test device; or
   co-located with the local test device.

18. The method of claim 17 further comprising synchronizing the local test device and the at least one additional test device with each other using, as a reference point, at least one of the test processing agents, a plurality of satellite signals, or a primary/grandmaster reference source.

19. The method of claim 17 further comprising grouping the local test device and the at least one additional test device into at least one test group for the network-under-test.

20. The method of claim 17 further comprising using the physical port of the local test device and a physical port of each of the at least one additional test device as multiple ports of a single test instrument of the network-under-test.

21. The method of claim 20 further initiating a test command using the single test instrument from the test processing agent, the test command comprising the test sequence and at least one additional test sequence to be initiated by the at least one additional test device.

22. The method of claim 21 further comprising receiving, at each of the at least one additional test device, additional external instructions for initiating the at least one additional test sequence.

* * * * *